United States Patent
Park (10) Patent No.: US 10,264,534 B1
(45) Date of Patent: Apr. 16, 2019

(54) POWER CONTROL FOR HIGH POWER CLASS WIRELESS DEVICES

(71) Applicant: Sprint Spectrum LP, Overland Park, KS (US)

(72) Inventor: Justin Sungki Park, Ashburn, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/697,959

(22) Filed: Sep. 7, 2017

(51) Int. Cl.
  *H04W 52/22* (2009.01)
  *H04W 52/24* (2009.01)
  *H04W 52/14* (2009.01)

(52) U.S. Cl.
  CPC ....... *H04W 52/242* (2013.01); *H04W 52/146* (2013.01); *H04W 52/226* (2013.01)

(58) Field of Classification Search
  CPC ............. H04W 52/242; H04W 52/146; H04W 52/226
  See application file for complete search history.

(56) References Cited

U.S. PATENT DOCUMENTS

| | | | |
|---|---|---|---|
| 8,699,391 B2 | 4/2014 | Yeon et al. | |
| 9,002,391 B1* | 4/2015 | Goyal | H04W 52/365 379/328 |
| 2013/0183993 A1* | 7/2013 | Ishii | H04W 8/22 455/452.1 |
| 2015/0092670 A1* | 4/2015 | Makhlouf | H04W 52/265 370/329 |
| 2017/0099640 A1* | 4/2017 | Boos | H04B 7/02 |

* cited by examiner

*Primary Examiner* — Dong-Chang Shiue (57) ABSTRACT

Systems, methods, and processing nodes for performing uplink power control of a high-powered wireless device in a wireless network based on first determining that a wireless device is capable of operating in a high-powered transmission mode, performing real-time adjustments to one or both of a pathloss scaling parameter or a power headroom level scaling parameter associated with the high-powered wireless device, and instructing the high-powered wireless device to utilize a transmit power level based on the adjusted one or both of the pathloss scaling parameter or the power headroom level scaling parameter.

16 Claims, 7 Drawing Sheets

POWER CONTROL FOR HIGH POWER CLASS WIRELESS DEVICES

TECHNICAL BACKGROUND

As wireless networks evolve and grow in complexity, there are ongoing challenges associated with reaching targeted coverage levels. In modern wireless networks, channel conditions change with time due to changes in the environment between the transmitter and receiver, and user mobility. Radio signals are attenuated as they travel through the air. When a transmitted signal propagates through the air it encounters different objects, and the signal will be attenuated, delayed in time and phase shifted due to reflection, diffraction and scattering. The attenuation caused by distance is modeled as pathloss. The signal variations due to diffraction are modeled as shadow fading (shadowing), whereas the effects of reflections are taken as multipath fading (multipath).

Power is an important resource for wireless devices. To minimize power consumption, power control is employed in the uplink channel between an access node and a wireless device. Power control plays an important role in system throughput, capacity, quality and power consumption. In a wireless multiuser environment, a number of users share the same radio resources. Frequency reuse is an important feature of a cellular system which improves the network capacity. Long-term evolution (LTE) networks support a frequency reuse factor of one to maximize the spectrum efficiency for the uplink and downlink transmissions. The presence of interference cannot be ignored due to this frequency reuse factor. To minimize the effect of interference, Power Control (PC) is used for the LTE uplink. It enhances system throughput performance and reduces interference to other cell users. The use of SC-FDMA in the LTE uplink eliminates interference between users in a cell (intra cell interference). However, the transmissions in neighboring cells are not orthogonal which causes interference between users (inter cell interference). This has a significant effect on the system throughput.

Recently, in an effort to boost coverage and enhance throughput in wireless networks, network operators have proposed deployment of wireless devices capable of transmitting at a maximum allowable transmit power that is higher than a current maximum allowable transmit power of off-the-shelf wireless devices and/or other currently deployed low power wireless devices. As shown in Table 1 below, the maximum allowable transmit power for wireless devices can be defined by the power class of the wireless device.

TABLE 1

| Operating Band | Power Class 1 Wireless Device | | Power Class 2 Wireless Device | | Power Class 3 Wireless Device | | Power Class 4 Wireless Device | |
|---|---|---|---|---|---|---|---|---|
| | Power (dBm) | Tol. (dB) | Power (dBm) | Tol. (dB) | Power (dBm) | Tol. (dB) | Power (dBm) | Tol. (dB) |
| Band I | 31 | ±2 | 26 | ±2 | 23 | ±2 | 21 | ±2 |
| Band II | — | — | 26 | ±2 | 23 | ±2 | 21 | ±2 |
| Band III | — | — | — | — | 23 | ±2 | 21 | ±2 |

For example, the maximum allowable transmit power level and tolerance (i.e., power error limits) with which wireless devices can transmit data on a given frequency band or sub-band (e.g., bands I-III) can be specified based on a pre-defined power class (e.g., power classes 1-4 illustrated in Table 1) of the wireless device rather than a physical maximum transmit capability of the wireless device. Off-the-shelf and/or other low-power wireless devices are currently defined in LTE as power class 3 and/or power class 4 wireless devices. Power class 3 and/or power class 4 low-power wireless devices (hereinafter referred to as standard or low-powered wireless devices, with the terms "standard" and "low" being equivalent and defined as any power level that is not "high") can be configured with a maximum allowable transmit power level of +23 dBm for frequency bands I-III with a nominal power tolerance of ±2 dB (e.g., for E-UTRA bands). High-power class wireless devices (hereinafter referred to as high-powered wireless device) are currently defined as power class 1 or power class 2 wireless devices. Power class 1 and/or power class 2 high-power class wireless devices can be configured with a maximum allowable transmit power level of +26 dBm for frequency bands I-II with a nominal power tolerance ±2 dB (e.g., for E-UTRA bands), as illustrated in Table 1.

Overview

Exemplary embodiments described herein include systems, methods, and processing nodes for performing uplink power control for high-powered wireless devices in a wireless network. An exemplary method described herein for performing uplink power control for high-powered wireless devices includes increasing a pathloss scaling parameter for a pathloss reported by a high-powered wireless device, and instructing the high-powered wireless device to utilize a transmit power level based on the increased pathloss scaling parameter. The high-powered wireless device is assigned to a high power class that enables a maximum transmit power level that is higher than a maximum transmit power level utilized by a standard-powered wireless device.

Exemplary systems described herein performing uplink power control for high-powered wireless devices include a processing node and a processor coupled to the processing node, the processor for configuring the processing node to perform operations including identifying a high-powered wireless device attached to an access node, wherein the high-powered wireless device is assigned to a high power class that enables a maximum transmit power level that is higher than a maximum transmit power level utilized by a standard-powered wireless device, performing real-time adjustments to one or both of a pathloss scaling parameter or a power headroom level scaling parameter associated with the high-powered wireless device, and instructing the high-powered wireless device to utilize a transmit power level based on the adjusted one or both of the pathloss scaling parameter or the power headroom level scaling parameter.

An exemplary processing node described herein for performing uplink power control for high-powered wireless devices is configured to perform operations including determining that a wireless device is capable of operating in a high-powered transmission mode, and adjusting a pathloss scaling parameter associated with the wireless device. The high-powered transmission mode enables the wireless device to utilize a transmit power level that is higher than a standard transmit power level utilized by standard-powered wireless devices.

DETAILED DESCRIPTION

Exemplary embodiments described herein include systems, methods, and processing nodes for performing uplink power control of a high-powered wireless device in a wireless network based on first determining that a wireless device is capable of operating in a high-powered transmission mode. The determination may be made upon identifying a high-powered wireless device attached to an access node based on a power class assigned to the high-powered wireless device. The high power class enables a maximum transmit power level that is higher than a maximum transmit power level utilized by a standard-powered wireless device. For the purposes of this disclosure, a standard-powered wireless device includes any wireless device that is not a high-powered wireless devices, and may include both standard-powered wireless devices and low-powered wireless devices (LPUE).

Determining that the high-powered wireless device is assigned to a high power class may be based on a power class identifier received from the high-powered wireless device. The power class identifier may be received in a capability report from the high-powered wireless device. For example, when a wireless device attaches to the access node, it transmits a capability report to the access node. The wireless device may attempt to attach to the access node using an initial attach request, or may attempt to re-attach to the access node upon resuming from idle, i.e. the wireless device performs cell-reselection procedures. The capability report may also be retrieved from past attach requests from the wireless device, or from a database or other node (such as a controller node) in communication with the access node.

For high-powered wireless devices attached to an access node, power control operations described herein include performing real-time adjustments to a pathloss scaling parameter and/or a power headroom level scaling parameter associated with the high-powered wireless devices. In an exemplary embodiment, performing the real-time adjustments includes increasing the pathloss scaling parameter. The increased pathloss scaling parameter is applied to a pathloss measured between a transmit power of a signal transmitted by the wireless device and received power of the signal received at the access node. The pathloss may be measured at the access node based on a known transmit power of the wireless device. In other words, the pathloss indicates a loss of power of a signal between transmission and reception. The pathloss is used by the access node to perform fractional power control operations, which generally include instructing a wireless device to increase its transmit power based on the measured pathloss. Consequently, increasing a compensation factor for a pathloss associated with a high-powered wireless device may be useful for enabling high-powered wireless devices to utilize their available transmit power. In an exemplary embodiment, increasing the compensation factor for a pathloss comprises setting a pathloss scaling parameter to a value greater than 1. In other exemplary embodiments, a pathloss scaling parameter is increased to a level such that a power headroom level received from the high-powered wireless device is the same as a power headroom level reported by the standard-powered wireless device when both the high-powered wireless device and the standard-powered wireless device are located at a cell edge of the access node. The high-powered wireless device is instructed to utilize a transmit power level based on the increased compensation factor.

In an embodiment, a power headroom level reported by a wireless device may be indicative of a location of said wireless device, or of a distance of said wireless device from the access node. As described above, high-powered wireless devices at a same distance from the access node as a standard-powered wireless device may report a higher power headroom level. For example, the power headroom level reported by a high-powered wireless device may be higher than a power headroom level reported by a standard-powered wireless device, given that high-powered wireless devices are capable of operating in a high-powered transmission mode. In some situations, when both wireless devices are adjacent a cell edge of an access node, the power headroom reported by the standard-powered wireless device may be 0 dBm, while the power headroom reported by the high-powered wireless device may be higher, e.g. 3 dBm. This higher power headroom level may indicate to the access node that the high-powered wireless device is not near the cell edge. Thus, the access node may not compensate by instructing the high-powered wireless device to utilize a higher transmit power, thereby rendering ineffective the capability of the high-powered wireless device to operate in the high-powered transmission mode.

Consequently, additional embodiments described herein include performing real-time power control adjustments by scaling the power headroom level received from high-powered wireless devices by a scaling factor or parameter. For example, the power headroom scaling parameter may be set to a number between 0.5 and 1. The scaled (i.e. reduced) power headroom level is utilized to perform additional power control operations, such as determining a distance of the high-powered wireless device from the access node, and/or setting a transmit power level for the high-powered wireless device based on the reduced power headroom level, rather than on the power headroom reported by the high-powered wireless device to the access node. Further, a noise level associated with the high-powered wireless device may be monitored, and the scaling of the power headroom parameter may be stopped upon determining that the noise level meets or exceeds a threshold.

Further, in addition to the systems and methods described herein, these operations may be implemented as computer-readable instructions or methods, and processing nodes on the network for executing the instructions or methods. These and other embodiments are further described herein and with reference to FIGS. 1-7.

Figure 1:
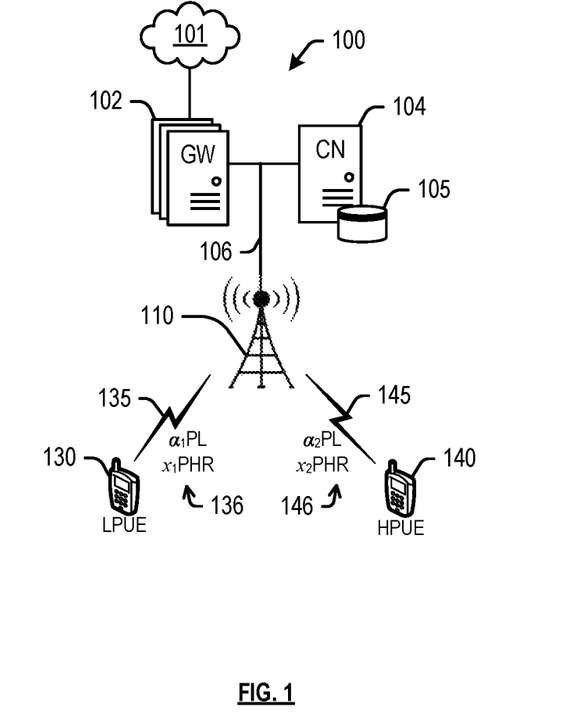
FIG. 1 depicts an exemplary system for performing uplink power control for high-powered wireless devices in a wireless network.

FIG. 1 depicts an exemplary system for adjusting handover thresholds. System 100 comprises a communication network 101, gateway 102, controller node 104, access node 110, and wireless devices 130 and 140. Wireless device 130 is illustrated as being a standard (or low) powered wireless device (LPUE), while wireless device 140 is illustrated as being a high-powered wireless device (HPUE). LPUE 130 communicates with access node 110 via a wireless communication link 135, and HPUE 140 communicates with access node 110 via a wireless communication link 145. Wireless communication links 135, 145 utilize air interface resources deployed by access node 110. The air interface resources are deployed by access node 110 utilizing any frequency band, or plurality of frequencies within a band class. For example, the air interface resources may occupy a frequency band class at or near 2.5 GHz, 1.9 GHz, 750 MHz, or any other frequency band class. Furthermore, wireless communication links 135, 145 may be configured to utilize carriers having different types of multiplexing modes, such as TDD-LTE, FDD-LTE, and so on.

Further, as described herein, access node 110, a processing node communicatively coupled to access node 110, or any other node within system 100, may be configured to perform uplink power control of HPUE 140 based on first determining that HPUE 140 is capable of operating in a high-powered transmission mode. The determination may be based on a power class assigned to HPUE 140 being a high power class. The high power class enables a maximum transmit power level that is higher than a maximum transmit power level utilized by a standard-powered wireless device such as LPUE 130. A power class identifier may be retrieved from a capability report from HPUE 140. For example, when HPUE 140 attaches to access node 110, it transmits a capability report to access node 110. HPUE 140 may attempt to attach to access node 110 using an initial attach request, or may attempt to re-attach to access node 110 upon resuming from idle, i.e. HPUE 140 performs cell-reselection procedures. The capability report may also be retrieved from past attach requests from HPUE 140, or from any other source of information related to attributes of wireless devices attached to access node 110 such as, for example, database 105 coupled to controller node 104.

Subsequently, for HPUE 140 (and for any high-powered wireless devices attached to access node 110), power control operations performed real-time adjustments to a pathloss scaling parameter $\alpha_2$ and/or a power headroom level scaling parameter $x_2$ associated with HPUE 140. In an exemplary embodiment, performing the real-time adjustments includes increasing the pathloss scaling parameter $\alpha_2$ such that it is greater than a pathloss scaling parameter $\alpha_1$ associated with LPUE 130. Pathloss scaling parameter $\alpha_2$ is applied to a pathloss measured between a transmit power of a signal transmitted by HPUE 140 and received power of the signal received at access node 110. The pathloss may be measured at access node 110 based on a known transmit power of HPUE 140. In other words, the pathloss indicates a loss of power of a signal between transmission and reception on communication link 135. The pathloss can used by access node 110 to perform fractional power control operations, which generally include instructing a wireless device to increase its transmit power based on the measured pathloss. Consequently, increasing pathloss scaling parameter $\alpha_2$ for a pathloss associated with HPUE 140 may be useful for enabling HPUE 140 to utilize its maximum available transmit power. In an exemplary embodiment, pathloss scaling parameter $\alpha_2$ is increased to a value greater than 1. In other exemplary embodiments, a pathloss scaling parameter is increased to a level such that a power headroom level (PHR) received from HPUE 140 is the same as a power headroom level (PHR) reported by LPUE 130 when both HPUE 140 and LPUE 130 are located at a cell edge of access node 110, wherein the cell edge is defined as a distance from access node 110 at which LPUE 130 has to transmit at a maximum power. At this distance, and further past this distance, the above operations enable HPUE 140 to utilize a higher transmit power level based on the increased pathloss scaling parameter $\alpha_2$.

In an embodiment, a power headroom level (PHR) reported by each of LPUE 130 and HPUE 140 can be indicative of a location of the respective wireless device, or of a distance from the access node. As described above, when LPUE 130 and HPUE 140 are at a same distance from access node 110, HPUE 140 may report a higher power headroom level, which may incorrectly indicate to access node 110 that HPUE 140 is closer than its actual physical location. Thus, access node 110 may prevent HPUE 140 from utilizing a high-powered transmission mode. Consequently, the PHR received from HPUE 140 may be scaled by a scaling parameter $x_2$. For example, the power headroom scaling parameter $x_2$ may be set to a number between 0.5 and 1. The scaled (i.e. reduced) PHR is utilized to perform additional power control operations, such as determining a distance of HPUE 140 from access node 110, and/or setting a transmit power level for HPUE 140 based on the reduced PHR, rather than on the PHR reported by HPUE 140 to access node 110. Further, a noise level associated with HPUE 140 may be monitored, and the scaling of power headroom parameter $x_2$ may be stopped upon determining that the noise level meets or exceeds a threshold.

Access node 110 can be any network node configured to provide communication between wireless devices 130, 140 and communication network 101, including standard access nodes such as a macro-cell access node, base transceiver station, a radio base station, an eNodeB device, an enhanced eNodeB device, or the like. In an exemplary embodiment, a macro-cell access node can have a coverage area in the range of approximately five kilometers to thirty-five kilometers and an output power in the tens of watts. Alternatively, access node 110 may comprise a short range, low power, small-cell access node such as a microcell access node, a picocell access node, a femtocell access node, or a home eNodeB device.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication links 106, 107. Access node 110 may communicate with other access nodes (not shown), using a wireless link or a wired link such as an X2 link. Components of exemplary access nodes 110 are further described with reference to FIG. 2.

Wireless devices 130, 140 may be any device, system, combination of devices, or other such communication platform capable of communicating wirelessly with access node 110 using one or more frequency bands deployed therefrom. Each of wireless devices 130, 140 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. Other types of communication platforms are possible. High power transmission capabilities of wireless device 140 are described further with respect to FIG. 3.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 132, 132, 133. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, Ti, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communication links 106, 107 may include S1 communication links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to elements within system 100, such as capabilities of wireless devices 130, 140, associations between pathlosses and scaling factors thereof, associations between power headroom and scaling factors thereof, and so on. This information may be requested by or shared with access node 110 via communication links 106, 107, X2 connections, and so on. The software comprises computer programs, firmware, or some other form of machine-readable instructions, and may include an operating system, utilities, drivers, network interfaces, applications, or some other type of software, and combinations thereof. For example, a processing node within controller node 104 can perform the operations described herein. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Figure 2:
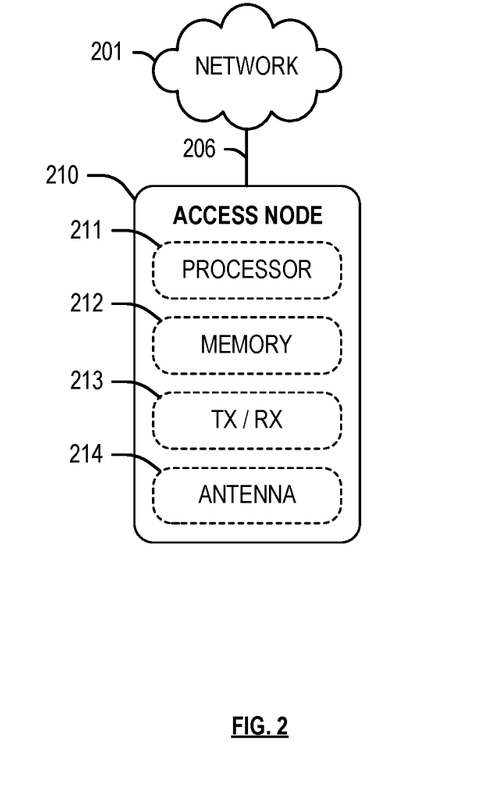
FIG. 2 depicts an exemplary access node.

FIG. 2 depicts an exemplary access node 210. Access node 210 may comprise, for example, a macro-cell access node, such as access node 110 described with reference to FIG. 1. Access node 210 is illustrated as comprising a processor 211, memory 212, transceiver 213, and antenna 214. Processor 211 executes instructions stored on memory 212, while transceiver 213 and antenna 214 enable wireless communication with other network nodes, such as wireless devices and relay nodes. Further, instructions stored on memory 212 can include performing uplink power control of a high-powered wireless device based on determining that a wireless device is capable of operating in a high-powered transmission mode, and performing real-time adjustments a pathloss scaling parameter and/or a power headroom level scaling parameter associated with the high-powered wireless devices. Increasing the pathloss scaling parameter may be part of a fractional power control mechanism, whereby a pathloss of a signal transmitted from high-powered wireless devices is increased by using a scaling factor that is greater than 1. Consequently, increasing a compensation factor for a pathloss associated with a high-powered wireless device may be useful for enabling high-powered wireless devices to utilize their available transmit power. Further, scaling the power headroom level received from high-powered wireless devices by a scaling factor or parameter is based on utilizing a power headroom scaling parameter between 0.5 and 1. The scaled (i.e. reduced) power headroom level is utilized to perform additional power control operations, such as determining a distance of the high-powered wireless device from the access node, and/or setting a transmit power level for the high-powered wireless device based on the reduced power headroom level, rather than on the power headroom reported by the high-powered wireless device to the access node. Further, a noise level associated with the high-powered wireless device may be monitored, and the scaling of the power headroom parameter may be stopped upon determining that the noise level meets or exceeds a threshold.

Figure 3:
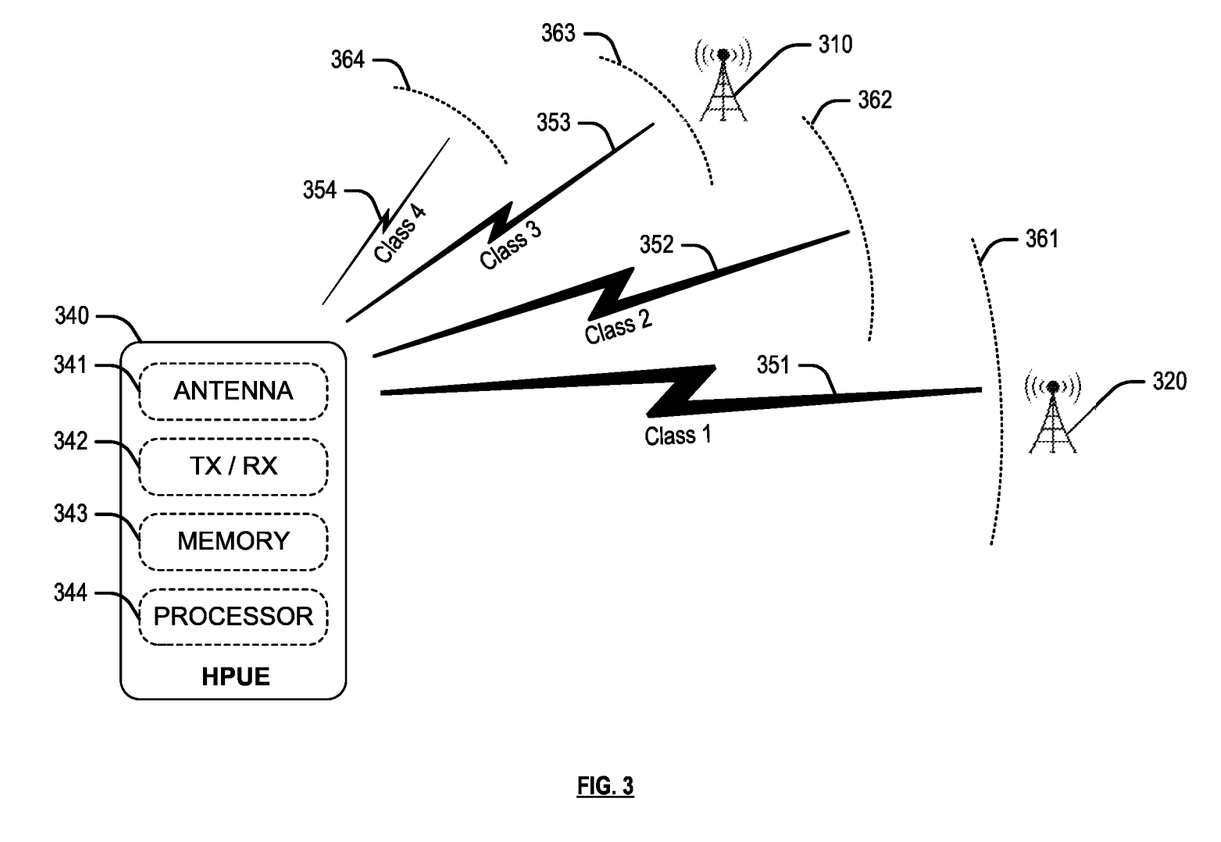
FIG. 3 depicts an exemplary wireless device capable of transmitting using different power classes.

FIG. 3 depicts an exemplary wireless device 340 capable of transmission in several power classes. As noted above, wireless devices can be configured as different power class wireless devices (e.g., high-power wireless devices and/or standard-power wireless devices as well as low-power wireless devices). Wireless device 340 is therefore equipped with an appropriate antenna 341 and transceiver 342 enabling increased transmit power from wireless device 340 to one or more access node 310, 320. For example, wireless device 340 is capable of operating in a transmission mode utilizing power class 1, to transmit an uplink transmission 351 at a range 361. Wireless device 340 may further switch transmission modes to utilizing power class 2 to transmit uplink transmission 352 at a range 362, utilizing power class 3 to transmit uplink transmission 353 at a range 363, and utilizing power class 4 to transmit uplink transmission 354 at a range 364. Antenna 341 and transceiver 342 are appropriately configured to utilize these differently-powered transmission modes. Further, an effective coverage area of an access node can be limited by an amount of power available to a wireless device, enabling wireless devices capable of utilizing high-power transmission modes to communicate with access nodes from a longer distance than standard-power wireless devices. In other words, effective coverage areas of access nodes 310, 320 can change dynamically based on a transmit power level of uplink transmissions 351, 352, 353, 354. Consequently, real-time adjustment of the power classes of wireless devices can be performed by network operators to increase the effective coverage area of their access nodes, enabling more consumers will to use a given access node. For example, to enable communication with access node 320 from a long distance (such as an edge of a coverage area), wireless device 340 may be configured to transmit uplink transmissions 351 utilizing a high-power transmission mode such as power class 1. Alternatively, to enable communication with access node 310 from a short distance, wireless device 340 may be configured to transmit uplink transmissions 351 utilizing a standard-power transmission mode such as power class 3. Moreover, controlling the transmit power level or changing the power class of wireless devices can be performed by setting a maximum uplink transmit power value allowed by the serving access node to be equal to a standard maximum uplink transmit power value, and broadcasting the maximum uplink transmit power value to the wireless device via, for example, a system information message.

Figure 4:
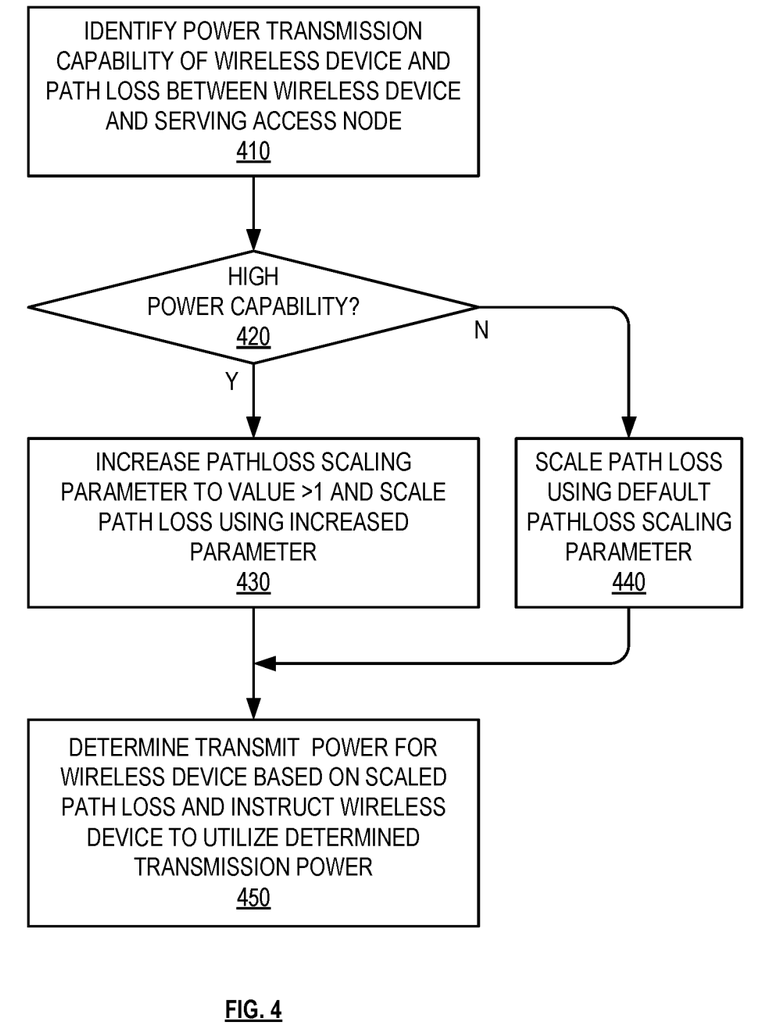
FIG. 4 depicts an exemplary method for performing uplink power control for high-powered wireless devices in a wireless network by adjusting a pathloss scaling parameter.

FIG. 4 depicts an exemplary method for performing uplink power control for high-powered wireless devices in a wireless network by adjusting a pathloss scaling parameter. The method of FIG. 4 may be implemented by an access node (such as access node 110, 210), by a controller node (such as controller node 104), or by any other network node. Although FIG. 4 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 410, wireless devices operating in a high-powered transmission mode are identified, and a pathloss is determined. For example, a wireless device attached to an access node (or attempting to attach to the access node) may be assigned to a high power class, which enables the wireless device to utilize a transmit power level that is higher than a standard transmit power level utilized by other wireless devices assigned to a standard power class. In other words, the wireless device may be capable of operating in a high-power transmission mode. Such a capability of the high-powered wireless device to operate in the high-powered transmission mode may be determined at 410 based on, for instance, an attach request or a capability report within the attach request transmitted from the wireless device or from any other source of information related to attributes of the high-powered wireless devices. Further, once the wireless device is connected to the access node, a pathloss may be determined of a signal between the wireless device and the access node. In an exemplary embodiment, the pathloss is determined at the access node based on a difference between a known transmit power of the wireless device and a receive power of the signal received at the access node. In another exemplary embodiment, the pathloss may be equivalent to a pathloss of a downlink signal measured at the wireless device. In other words, since the pathloss is representative of signal losses occurring in the space between the wireless device and the access node, uplink and downlink signals are likely to suffer the same amount of pathlosses.

At 420, if a high-power capability of the wireless device is confirmed, then at 430 a pathloss scaling parameter is adjusted in real-time to increase a transmit power level of the wireless device and, at 450, a transmit power is determined for the wireless device, and the wireless device is instructed to utilize a transmit power level based on the increased pathloss scaling parameter. The transmit power is an output power level for the wireless device on the uplink channel, referred to as the physical uplink shared channel (PUSCH) in LTE systems. The LTE uplink power control contains a closed loop power control term and an open loop power control term. The open loop term compensates for pathloss and shadowing. The closed loop term gives further performance improvements by compensating for variations in the channel. The transmit power for a wireless device Ptx for the uplink transmission is defined in dB as:

$$Ptx = \min\{Pmax, Po + 10\log(M) + \alpha PL + \delta mcs + f(\Delta)\}$$

where Pmax is the maximum power allowed by the wireless device in uplink transmission, M is the number of allocated Physical Resource Blocks (PRBs) per user, Po is the power contained in one PRB, $\alpha$ is the pathloss scaling parameter, PL is the estimated uplink pathloss at the wireless device, $\delta mcs$ is a MCS dependent offset which is device-specific, and $f(\Delta)$ is a closed loop correction function. The uplink power control can be broken into five parts. The first part is the amount of additional power needed based on the number (M) of PRBs. The higher the number of PRBs, the higher the power required. The second part is the received power Po which is a cell specific parameter. The third part is the product of Pathloss (PL) and a. The fourth part is a MCS dependent offset value which is device-specific and is used to adjust the power based on the MCS assigned by the access node. Last, $f(\Delta)$ is the closed loop correction value which is closed loop feedback. It is the additional power that the wireless device adds to the transmission based on feedback from the access node. The values of Po and a are the same in the cell and are signaled from the access node to the wireless device as broadcast information. The pathloss may be measured at the wireless device or at the access node, and is based on the Reference Symbol Received Power (RSRP) as further described herein. This information is sufficient for the wireless device to initially set its transmit power. $\delta mcs$ is a device-specific parameter dependent on the modulation and coding employed. $f(\Delta i)$ is a correction function that uses a correction value $\Delta$ which is signaled by the access node to a user after it sets its initial transmit power.

When the value of $\alpha$ is between 0 and 1 it means only a fraction of the pathloss is compensated to control the wireless device transmit power. Such a mechanism is called open loop power control or fractional power control. A value between 0 and 1 represents fractional compensation for the pathloss. There is no power control for $\alpha=0$ and all users transmit with the same power, while with $\alpha=1$ users transmit with a power that completely compensates for the pathloss, which is referred to as full compensation or conventional power control. The measured pathloss together with Po and a broadcast by the access node are generally sufficient to set the initial transmit power for open loop power control. The closed loop term has the ability to adjust the uplink transmit power with the closed loop correction value, also known as Transmit Power Control (TPC) commands. TPC commands are transmitted by the access node to the wireless device based on the target SINR and the measured SINR. The correction function $f(\Delta)$ and modulation and coding scheme ($\delta mcs$) are not considered relevant to this disclosure. Thus, the transmit power in the uplink is then:

$$Ptx = Po + 10\log(M) + \alpha PL (dBm)$$

In this embodiment, at 430, the pathloss scaling parameter $\alpha$ is set to a value greater than 1. The increased pathloss scaling parameter is applied to the pathloss measured between a transmit power of a signal transmitted by the wireless device and received power of the signal received at the access node. In other exemplary embodiments, a pathloss scaling parameter is increased to a level such that a power headroom level received from the high-powered wireless device is the same as a power headroom level reported by the standard-powered wireless device when both the high-powered wireless device and the standard-powered wireless device are located at a cell edge of the access node. If, however, at 420 the high power capability is not present, then at 440 the pathloss scaling parameter is set to a default level, as is performed in conventional fractional power control operations for standard-powered wireless devices, as described above.

Figure 5:
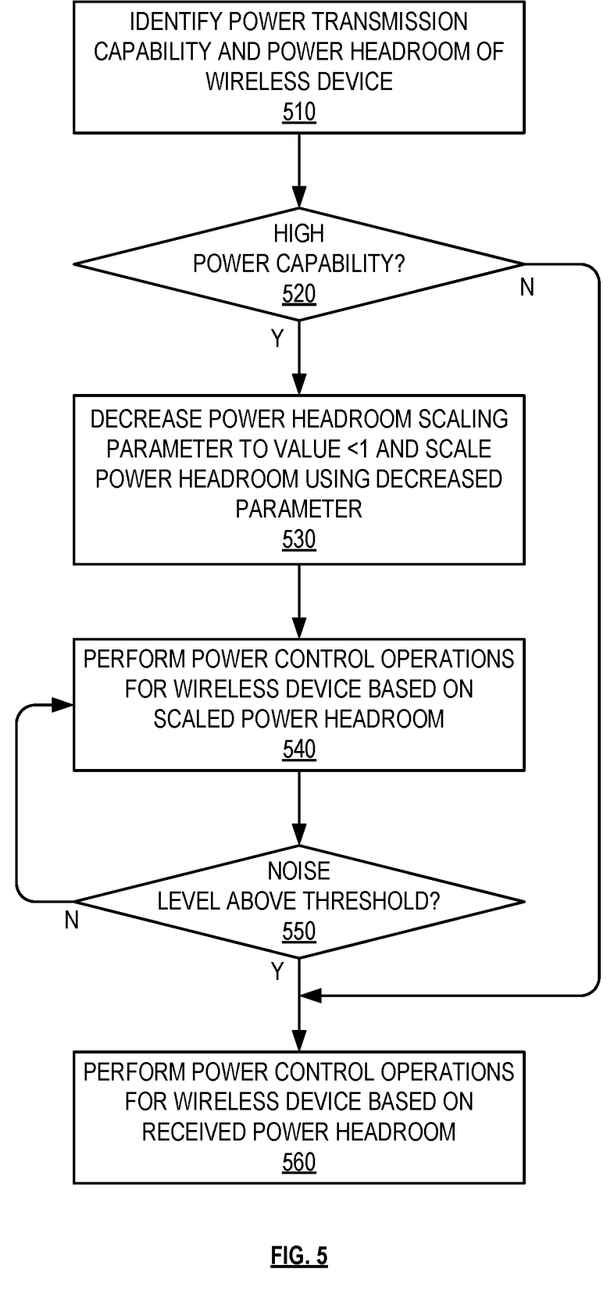
FIG. 5 depicts another exemplary method for performing uplink power control for high-powered wireless devices in a wireless network by adjusting a power headroom scaling parameter.

FIG. 5 depicts another exemplary method for performing uplink power control for high-powered wireless devices in a wireless network by adjusting a power headroom scaling parameter. The method of FIG. 5 may be implemented by an access node (such as access node 110, 210), by a controller node (such as controller node 104), or by any other network node. Although FIG. 5 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 510, wireless devices operating in a high-powered transmission mode are identified, and a power headroom of the wireless devices is determined. For example, a wireless device attached to an access node (or attempting to attach to the access node) may be assigned to a high power class, which enables the wireless device to utilize a transmit power level that is higher than a standard transmit power level utilized by other wireless devices assigned to a standard power class. In other words, the wireless device may be capable of operating in a high-power transmission mode. Such a capability of the high-powered wireless device to operate in the high-powered transmission mode may be determined at 510 based on, for instance, an attach request or a capability report within the attach request transmitted from the wireless device or from any other source of information related to attributes of the high-powered wireless devices. Further, once the wireless device is connected to the access node, a power headroom level may be received from the wireless device. For example, in LTE systems, the power headroom level is reported by the wireless device to the access node to indicate to the access node how much power the wireless device utilized to transmit uplink data during the previous subframe. This allows the access node to perform effective link adaptation and resource allocation for subsequent uplink transmissions from the wireless device. For example, if the wireless device indicates a positive power headroom level, then the access node may determine that the wireless device is able to increase its transmit power. If no power headroom is reported, or if the power headroom level is 0, then there may be no variation in power control operations at the access node. If the wireless device reports a negative power headroom level, then the access node may determine that the wireless device is operating at maximum power, and may determine to reduce the transmit power of the wireless device.

In an embodiment, a power headroom level reported by a wireless device may be indicative of a location of said wireless device, or of a distance of said wireless device from the access node. As described above, high-powered wireless devices at a same distance from the access node as a standard-powered wireless device may report a higher power headroom level. For example, the power headroom level reported by a high-powered wireless device may be higher than a power headroom level reported by a standard-powered wireless device, given that high-powered wireless devices are capable of operating in a high-powered transmission mode. In some situations, when both wireless devices are adjacent a cell edge of an access node, the power headroom reported by the standard-powered wireless device may be 0 dBm, while the power headroom reported by the high-powered wireless device may be higher, e.g. 3 dBm. This higher power headroom level may indicate to the access node that the high-powered wireless device is not near the cell edge. The access node may not compensate by instructing the high-powered wireless device to utilize a higher transmit power, thereby rendering ineffective the capability of the high-powered wireless device to operate in the high-powered transmission mode.

Consequently, upon determining a high power capability at 520, at 530 the power headroom level received from high-powered wireless devices may be reduced by decreasing a power headroom scaling factor or parameter. For example, the power headroom scaling parameter may be set to a number between 0.5 and 1. The scaled (i.e. reduced) power headroom level is utilized to perform additional power control operations at 540, such as determining a distance of the high-powered wireless device from the access node, and/or setting a transmit power level for the high-powered wireless device based on the reduced power headroom level, rather than on the power headroom reported by the high-powered wireless device to the access node. Further, at 550, a noise level associated with the high-powered wireless device may be monitored, and the scaling of the power headroom parameter may be stopped upon determining that the noise level meets or exceeds a threshold. For example, scaling the power headroom with a lower scaling parameter may result in a high-powered wireless device utilizing an increased transmit power, and thereby causing interference to other devices or nodes in the wireless network. If noise (or any other metric) associated with this interference exceeds a threshold at 550, then the scaling may be stopped, and power control operations performed based on the received (i.e. unscaled) power headroom at 560. Further, if at 520 it is determined that the wireless device is not capable of operating in a high-power transmission mode, then power control operations are performed in 560 using the received power headroom level.

Figure 6A:
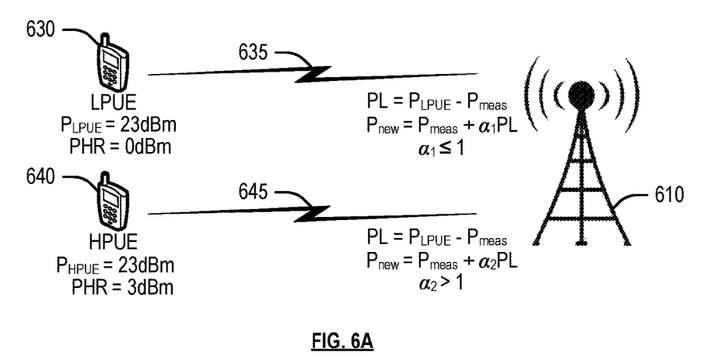
FIGS. 6A-6B respectively depict exemplary adjustments to pathloss scaling parameters and power headroom parameters of high-powered wireless devices.
Figure 6B:
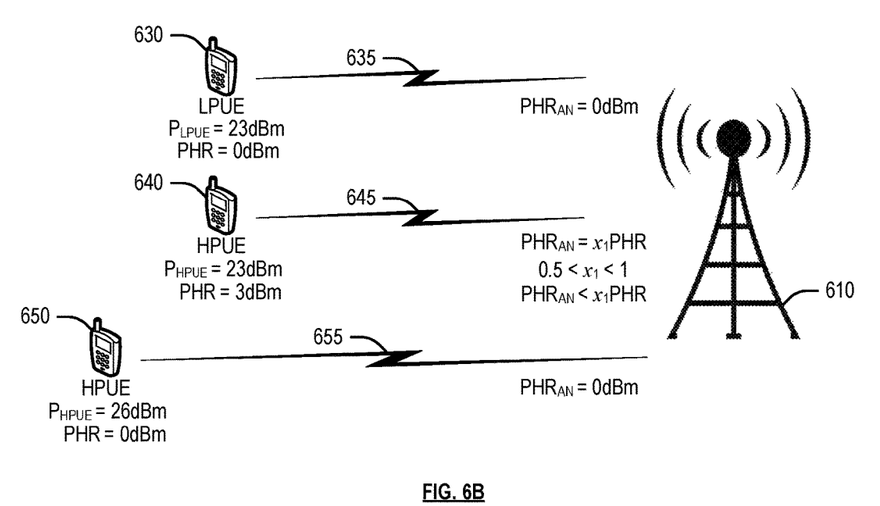

FIGS. 6A-6B respectively depict exemplary adjustments to pathloss scaling parameters and power headroom parameters of high-powered wireless devices. In each of these figures, wireless device 630 may be considered equivalent to wireless device 130 in FIG. 1, i.e. a standard or low powered wireless device (LPUE), and wireless devices 640 and 650 may be considered equivalent to wireless device 140 in FIG. 1, i.e. a high-powered wireless device (HPUE). Further, access node 610 may be considered equivalent to access node 110 in FIG. 1. One skilled in the art, using the disclosures provided herein, will appreciate that various components depicted herein may be omitted, rearranged, combined, and/or adapted in various ways.

FIG. 6A depicts exemplary adjustments to a pathloss (PL) scaling parameter of wireless devices 630 and 640. To begin, a power class of each of wireless devices 630 and 640 is identified by access node 610. For example, HPUE 640 may be assigned to a high power class, which enables HPUE 640 to utilize a transmit power level that is higher than a standard transmit power level utilized by LPUE 630 assigned to a standard or low power class. The capability (or lack thereof) of each wireless device 630, 640 operate in the high-powered transmission mode may be determined based on, for instance, an attach request or a capability report within the attach request transmitted from said each wireless device 630, 640, or from any other source of information related to attributes of said each wireless device 630, 640.

Further, once said each wireless device 630, 640 is connected to access node 610, a pathloss may be determined of signals on each respective communication link 635, 645 between said each wireless device 630, 640 and access node 610. In an exemplary embodiment, the pathloss PL is determined at access node 610 based on a difference between a known transmit power of said each wireless device 630, 640 (i.e. $P_{LPUE}$ and $P_{HPUE}$, respectively) and a receive power $P_{meas}$ of signals received at access node 610. In another exemplary embodiment, the pathloss may be equivalent to a pathloss of a downlink signal measured at said each wireless device 630, 640. In other words, since the pathloss is representative of signal losses occurring in the space between the wireless device and the access node, uplink and downlink signals on each of communication links 635, 645 are likely to suffer the same amount of pathlosses. As described above, the prescribed transmit power (i.e. transmit power determined by access node 610 for said each wireless device 630, 640) may be defined as:

$$Ptx = P_{meas} + 10 \log(M) + \alpha_{1,2} PL (dBm)$$

where M is the number of allocated Physical Resource Blocks (PRBs) per user, $P_{meas}$ is the power measured at access node 610, $\alpha_{1/2}$ is the pathloss scaling parameter for said each wireless device 630, 640 respectively, and PL is the estimated uplink pathloss. Ptx is the additional power that said each wireless device 630, 640 adds to the respective $P_{LPUE}/P_{HPUE}$ based on feedback from access node 610.

Further, for LPUE 630, standard fractional power control may be used, wherein the value of $\alpha_1$ is between 0 and 1 such that only a fraction of the pathloss is compensated to control the wireless device transmit power. Such a mechanism is called open loop power control or fractional power control. A value between 0 and 1 represents fractional compensation for the pathloss. There is no power control for $\alpha_1 = 0$ and all users transmit with the same power, while with $\alpha_1 = 1$ users transmit with a power that completely compensates for the pathloss, which is referred to as full compensation or conventional power control. The measured pathloss together with $P_{meas}$ and $\alpha_1$ broadcast by access node 610 are generally sufficient to set the initial transmit power for open loop power control.

However, upon determining that HPUE 640 is capable of a high-power transmission mode, then a pathloss scaling parameter $\alpha_2$ is adjusted in real-time to increase a transmit power level of HPUE 640. The pathloss scaling parameter $\alpha_2$ may be set to a value greater than 1. The increased pathloss scaling parameter $\alpha_2$ is applied to the pathloss PL associated with HPUE 640. In some exemplary embodiments, $\alpha_2$ is increased to a level such that a power headroom level PHR received from HPUE 640 is the same as a power headroom level PHR reported by LPUE 630 when both devices are located at a cell edge of access node 610.

FIG. 6B depicts exemplary adjustments to a power headroom (PHR) scaling parameter of wireless devices 630 and 640. As described herein, a PHR reported by a wireless device may be indicative of a location of said wireless device, or of a distance of said wireless device from the access node. For example, LPUE 630 may transmit a PHR level of 0 dBm from a cell edge of access node 610, as it is transmitting at a power level $P_{LPUE} = 23$ dBm, i.e. a maximum transmit power allowed for LPUE 630. In contrast, HPUE 640 may transmit a higher PHR level of 3 dBm from the same location, as it may be transmitting at a power level $P_{LPUE}$=23 dBm, but has a maximum transmit power of 26 dBm, given that HPUE 640 is capable of operating in a high-powered transmission mode. This higher power headroom level may indicate to access node 610 that HPUE 640 is not near the cell edge. In further contrast, HPUE 650 may transmit a PHR level of 0 dBm from a farther-away location, as it may be transmitting at its own maximum power level $P_{HPUE}$=26 dBm. The access node therefore may determine that HPUE 650 and LPUE 630 are at the cell edge, but may not compensate for HPUE 640, thereby rendering ineffective the capability of HPUE 640 to operate in the high-powered transmission mode.

Consequently, upon determining a high power capability of HPUE 640, the PHR received from HPUE 640 may be reduced by decreasing a power headroom scaling factor or parameter $x_1$. For example, the power headroom scaling parameter $x_1$ may be set to a number between 0.5 and 1. The scaled (i.e. reduced) power headroom level PHR is utilized by access node 610 to perform additional power control operations, such as determining a distance of HPUE 640 from access node 610, and/or setting a transmit power level for HPUE 640 based on the reduced power headroom level $PHR_{AN}$, rather than on the power headroom level PHR reported by HPUE 640. Further, a noise level associated with HPUE 640 may be monitored, and the scaling of the power headroom level PHR may be stopped upon determining that the noise level meets or exceeds a threshold. For example, scaling the power headroom with a lower scaling parameter may result in a HPUE 640 utilizing an increased transmit power, and thereby causing interference to other devices or nodes in the wireless network. If noise (or any other metric) associated with this interference exceeds a threshold, then the scaling may be stopped, and power control operations performed based on the received (i.e. unscaled) power headroom level PHR.

The methods, systems, devices, networks, access nodes, and equipment described above may be implemented with, contain, or be executed by one or more computer systems and/or processing nodes. The methods described above may also be stored on a non-transitory computer readable medium. Many of the elements described herein may be, comprise, or include computers systems and/or processing nodes. This includes, but is not limited to: access nodes 110, 210, 610, controller node 104, and/or network 101.

Figure 7:
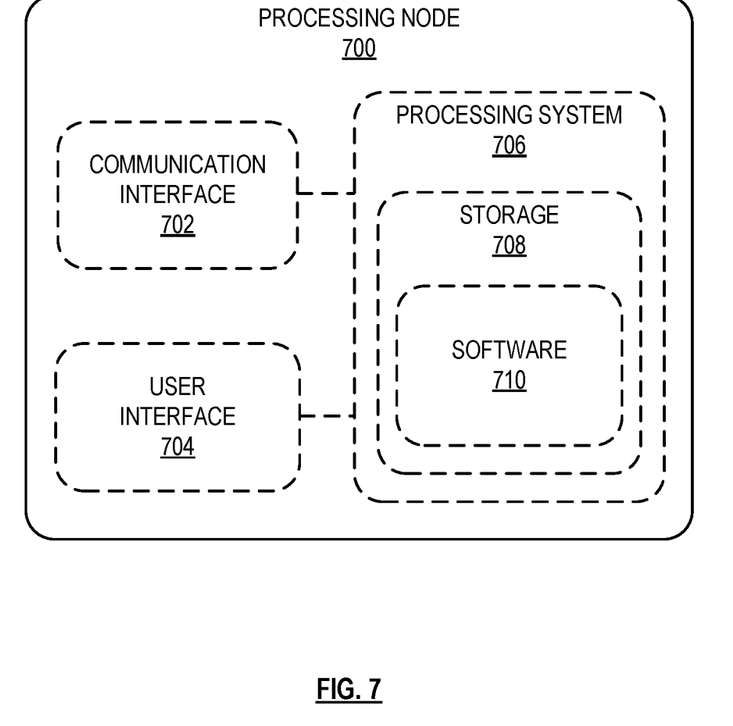
FIG. 7 depicts an exemplary processing node for performing uplink power control for high-powered wireless devices in a wireless network.

FIG. 7 depicts an exemplary processing node for performing carrier aggregation based on control channel load levels. Processing node 700 comprises a communication interface 702, user interface 704, and processing system 706 in communication with communication interface 702 and user interface 704. Processing system 706 includes storage 708, which can comprise a disk drive, flash drive, memory circuitry, or other memory device. Storage 708 can store software 710 which is used in the operation of the processing node 700. Storage 708 may include a disk drive, flash drive, data storage circuitry, or some other memory apparatus. For example, storage 708 may include a buffer. Software 710 may include computer programs, firmware, or some other form of machine-readable instructions, including an operating system, utilities, drivers, network interfaces, applications, or some other type of software. For example, software 710 may include a module for performing transmit power control operations described herein. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for performing uplink power control of a high-powered wireless device in a wireless network, the method comprising:
   receiving a power headroom level from a high-powered wireless device, wherein the high-powered wireless device is assigned to a high power class that enables a maximum transmit power level that is higher than a maximum transmit power level utilized by a standard-powered wireless device;
   increasing a pathloss scaling parameter for a pathloss reported by the high-powered wireless device to a level such that the power headroom level is the same as a power headroom level reported by the standard-powered wireless device when both the high-powered wireless device and the standard-powered wireless device are located at a cell edge of an access node; and
   instructing the high-powered wireless device to utilize a transmit power level based on the increased pathloss scaling parameter.

2. The method of claim 1, further comprising receiving a capability report from the high-powered wireless device; and determining that the high-powered wireless device is assigned to the high power class based on a power class identifier within the capability report.

3. The method of claim 2, wherein the capability report is received from one or both of an initial attach request or a resume from idle request from the high-powered wireless device.

4. The method of claim 1, wherein increasing the pathloss scaling parameter comprises increasing the pathloss scaling parameter to a value greater than 1.

5. The method of claim 1, further comprising scaling a power headroom level received from the high-powered wireless device to obtain a scaled power headroom level; and instructing the high-powered wireless device to utilize a transmit power level based further on the scaled power headroom level.

6. The method of claim 5, wherein scaling the power headroom level comprises reducing the power headroom level by utilizing a scaling factor having a value less than 1.

7. A system for performing uplink power control of a high-powered wireless device in a wireless network, the system comprising
a processing node; and
a processor coupled to the processing node, the processor for configuring the processing node to perform operations comprising:
identifying a high-powered wireless device attached to an access node, wherein the high-powered wireless device is assigned to a high power class that enables a maximum transmit power level that is higher than a maximum transmit power level utilized by a standard-powered wireless device;
performing real-time adjustments to one or both of a pathloss scaling parameter or a power headroom level scaling parameter associated with the high-powered wireless device wherein performing the real-time adjustments comprises increasing the pathloss scaling parameter to a level such that the power headroom level is the same as a power headroom level reported by the standard-powered wireless device when both the high-powered wireless device and the standard-powered wireless device are located at a cell edge of an access node; and
instructing the high-powered wireless device to utilize a transmit power level based on the adjusted one or both of the pathloss scaling parameter or the power headroom level scaling parameter.

8. The system of claim 7, wherein the increased pathloss scaling parameter is applied to the pathloss measurement performed by the high-powered wireless device and reported to the access node.

9. The system of claim 7, wherein performing the real-time adjustments comprises reducing the power headroom scaling parameter.

10. The system of claim 9, wherein the reduced power headroom scaling parameter is applied to a power headroom reported by the high-powered wireless device to the access node.

11. A processing node for performing uplink power control of a high-powered wireless device in a wireless network, the processing node being configured to perform operations comprising:
determining that a wireless device is capable of operating in a high-powered transmission mode; and
adjusting a pathloss scaling parameter associated with the wireless device,
wherein the high-powered transmission mode enables the wireless device to utilize a transmit power level that is higher than a standard transmit power level utilized by standard-powered wireless devices; and
wherein the pathloss scaling parameter is raised to a level such that a power headroom level of the wireless device is the same as a power headroom level of a standard-powered wireless device when both the wireless device and the standard-powered wireless device are located at a cell edge of an access node.

12. The processing node of claim 11, wherein the operations further comprise:
receiving a power headroom level from the wireless device;
scaling the power headroom level to obtain a scaled power headroom level; and
utilizing the scaled power headroom level to perform additional power control operations for the wireless device.

13. The processing node of claim 12, wherein scaling the power headroom level comprises reducing the received power headroom level.

14. The processing node of claim 12, wherein the additional power control operations comprise estimating a location of the wireless device based on the reduced power headroom level.

15. The processing node of claim 12, wherein the additional power control operations comprise instructing the wireless device to adjust an uplink transmit power of the wireless device based on the reduced power headroom level.

16. The processing node of claim 12, wherein the operations further comprise determining that a noise level associated with the wireless device exceeds a threshold, and stopping the scaling of the power headroom level.

* * * * *